UNITED STATES PATENT OFFICE 2,628,958

POLYMERIZABLE ESTERS OF ALPHA-METHYLENE CARBOXYLIC ACIDS

James Arthur Bittles, Jr., Wilmington, Del., assignor to E. I. du Pont de Nemours & Company, Wilmington, Del., a corporation of Delaware No Drawing. Application May 3, 1950, Serial No. 159,870

7 Claims. (Cl. 260—89.5)

This invention relates to new organic compounds and polmerization products thereof and, more particularly, to polymerizable fluorinated esters and polymers thereof.

Despite the great technical interest in fluorinated compounds and the considerable advances made in their chemistry in recent years, polymerizable esters containing, in the alcohol moiety, a perfluorinated aliphatic chain of at least four carbon atoms have heretofore remained unknown.

An object of this invention is to provide a new class of polymerizable organic compounds. A more particular object is to provide polymerizable esters of primary alcohols having a perfluorinated aliphatic chain of at least four carbon atoms, and polymers of such esters. A further object is to provide a practical process of preparing such polymerizable esters and polymers thereof. Other objects will be apparent from the description of the invention given hereinafter.

The above objects are accomplished according to the present invention by the preparation of esters of alphamethylene aliphatic carboxylic acids wherein the alkenyl radical attached to the carboxyl group contains two to three carbon atoms, inclusive, and fluoroalkanols having an odd number of carbon atoms of from five to thirteen, inclusive, and, exclusive of the terminal carbon atom in the primary alcohol group, —CH2OH, two fluorine atoms on every carbon atom and one hydrogen on the other terminal carbon atom. The invention further comprises subjecting such esters to polymerization conditions whereby polymers thereof are obtained.

The new esters of the present invention may be represented by the formula $$CH_2=C(R)COOCH_2(CF_2CF_2)_nH$$

wherein R is hydrogen or a methyl radical, and n is an integer of from two to six, inclusive. These new esters are esters of either acrylic or methacrylic acid.

The esters of the present invention may be readily prepared by reacting an alpha-methylene aliphatic carboxylic acid, i. e., acrylic or methacrylic acids, their halides, i. e., their chlorides and bromides, their anhydrides or their lower alkyl esters, preferably methyl or ethyl, with tetrafluoroethylene/methanol telomers, i. e., primary perfluoroalkanols of the formula

wherein n is an integer from two to six, inclusive.

The preparation of the herein considered perfluoroalkanols is described in Joyce U. S. Patent 2,559,628. Such preparation is carried out by heating a mixture of tetrafluoroethylene with methanol at a temperature of 50° C.–350° C. in the presence of a free radical-producing catalyst such as, for example, organic and inorganic peroxides, persulfates, and the azonitriles described in Hunt U. S. Patent 2,471,959. The resulting mixture can be separated into definite fractions by suitable methods such as steam distillation, fractional distillation, fractional crystallization, and the like.

The perfluoroalkyl acrylates and methacrylates of this invention may be polymerized at ordinary temperatures and pressures even without the aid of a polymerization catalyst. The polymerization is most suitably conducted, however, in the presence of a free-radical producing catalyst at temperatures of 25° C. to 125° C. The polymerization initiator can be, for example, an organic or inorganic peroxide such as diethyl peroxide, di-tert.-butyl peroxide, benzoyl peroxide, lauroyl peroxide, hydrogen peroxide, and the like; or it can be a salt of a peracid such as ammonium sulfate, sodium perborate, potassium percarbonate, and the like; or it can be one of the very active organic azo catalysts described in Hunt U. S. Patent 2,471,959, such as alpha,alpha'-azobis (alpha,gamma-dimethylvaleronitrile).

The preparation and polymerization of typical esters of the present invention are illustrated in the following examples in which all parts, unless otherwise specified, are by weight.

Example I

Acrylic acid, 14.5 parts, stabilized with 1% of its weight of hydroquinone, was esterified with 46.5 parts of octafluoropentanol, $H(CF_2CF_2)_2CH_2OH$ (B. P. 140° C.–141° C.), in the presence of a few drops of concentrated sulfuric acid as catalyst and 100 parts of benzene. This mixture was refluxed for fifteen hours during which time water was removed continuously from the benzene-water azeotrope, the benzene being returned to the reaction vessel. The crude reaction mixture was distilled under 7 mm. pressure to give 30.5 parts of a fraction boiling at 35° C.–40° C. Redistillation of this material through a helices-packed column yielded 27 parts of colorless, oily octafluoropentyl acrylate,

boiling at 69° C.–70° C./21 mm., $n_D^{25}$ 1.3431. The product is soluble in ether, ethanol, carbon tetrachloride and benzene but is insoluble in water.

Analysis: Calculated for $C_8H_6F_8O_2$: F, 53.2%. Found: F, 53.8%, 53.9%.

Example II

The octafluoropentyl acrylate of Example I may also be prepared by reaction of the acid halide with the alcohol. A mixture of 20 parts of acrylyl chloride and 46 parts of octafluoropentanol, $H(CF_2CF_2)_2CH_2OH$, was refluxed for about 30 minutes. On distillation of the crude reaction mixture, 48.5 parts of a framtion, B. P. 95° C.–104° C./98 mm., was obtained. Redistillation of this fraction through a helices-packed column yielded 23.5 parts of the pure ester, B. P. 70° C.–71° C./20 mm.

Fifteen (15) parts of this octafluoropentyl acrylate was placed in a sealed glass vessel in the presence of oxygen and allowed to stand at 25° C. for several months. After removal of a minor amount of excess monomer by heating for 24 hours at 110° C. under vacuum (30 mm.), a clear, transparent, rubbery polymer, $n_D^{25}$ 1.3800, was obtained. This polymer is insoluble in dibutyl ether, benzene, cyclohexanone, ethanol and phenol, and can be molded at 170° C. into a pliable, rubbery, transparent film. The polymer is also distinguished by its relatively high ignition temperature being considerably superior to the common polymethyl acrylate in this respect.

Similar results were obtained by photopolymerization of a mixture of 5 parts of the monomeric ester and 0.05 part of 1,1'-azodicyclohexanecarbonitrile initiator blanketed with nitrogen and sealed in a glass reactor. Polymerization was accomplished by exposure for 10 to 12 hours to the light from two 15-watt fluorescent bulbs placed at a distance of 5 cm. from the reaction mixture.

Example III

A mixture of 116 parts of octafluoropentanol, $H(CF_2CF_2)_2CH_2OH$, and 52.3 parts of methacrylyl chloride was refluxed for six hours at which point the reflux temperature had risen to 186° C. Fractional distillation of the reaction mixture yielded 42 parts of colorless, oily octafluoropentyl methacrylate, $$CH_2=C(CH_3)COOCH_2(CF_2CF_2)_2H$$

B. P. 83° C.–85° C./24 mm.; $n_D^{25}$ 1.3553.

Analysis: Calculated for $C_9H_8F_8O_2$: F, 50.6%. Found: F, 49.4%.

A mixture of 15 parts of octafluoropentyl methacrylate and 0.01 part of disuccinoyl peroxide blanketed under nitrogen in a sealed glass reactor, was heated at 50° C.–60° C. for 15 hours. The polymeric reaction product was washed thoroughly with dibutyl ether to remove unreacted monomer. After drying in a vacuum oven, a 90 percent yield of a clear, pliable polymer was obtained. This polymer was pressed at 160° C. into a transparent film having a refractive index at 25° C. of 1.3935. This polymeric product exhibits the characteristic thermal stability of the corresponding acrylate.

Octafluoropentyl methacrylate was readily polymerized at 100° C. with benzoyl peroxide and alpha,alpha'-azodiisobutyronitrile as initiators.

Example IV

A stainless steel, high-pressure shaker tube was flushed with oxygen-free nitrogen and charged with 10 parts of octafluoropentyl methacrylate, 0.15 part of 1,1'-azodicyclohexanecarbonitrile, and 80 parts of benzene. The reactor was closed, kept cold in a dry-ice/acetone bath, evacuated and then pressured with ethylene to 1000 atm. The reactor was heated at 93° C.–98° C. for 5 hours during which time the ethylene pressure was maintained at 900–1000 atmospheres. After the excess ethylene had been bled off, the polymeric reaction mass was macerated, treated with 500 parts of methanol, and filtered. It was then slurried with 200 parts of acetone, filtered and air dried. Fluorine analysis of the resulting copolymer showed that it contained a molal ratio of ethylene to octafluoropentyl methacrylate of 36:1. The polymer was pressed at 160° C. into a translucent, tack-free, cold-drawable film.

It will be understood that the above examples are merely illustrative and that the present invention broadly comprises esters having the formula $$CH_2=C(R)COOCH_2(CF_2CF_2)_nH$$

wherein R is hydrogen or a methyl radical and $n$ is an integer from two to six, inclusive, and the polymerization products of such esters. The octafluoropentyl acrylate and methacrylate esters and their preparation as shown in the Examples are typical illustrations of the invention. Esters of other polyfluoroalkanols such as dodecafluoroheptanol, $H(CF_2CF_2)_3CH_2OH$, hexadecafluorononanol, $H(CF_2CF_2)_4CH_2OH$, eicosafluoroundecanol, $H(CF_2CF_2)_5CH_2OH$, and tetracosafluorotridecanol, $H(CF_2CF_2)_6CH_2OH$ may be prepared by substituting any of these in corresponding chemical proportions for the octafluoropentanol in the examples. This invention likewise includes the use of mixtures of these polyfluoroalkanols. To illustrate, by employing the procedure of Example II using either acrylyl or methacrylyl chloride and, in place of octafluoropentanol, a mixture of polyfluoroalkanols $$H(CF_2CF_2)_nCH_2OH$$

consisting chiefly of the above 7-, 9-, 11- and 13-carbon polyfluoroalkanols, the corresponding polyfluoroacrylates and methacrylates can be obtained.

In the preparation of these esters regardless of whether the tetrafluoroethylene/methanol telomers are reacted with acrylic or methacrylic acid or, alternatively, with their halides, anhydrides, or lower alkyl esters, it is preferable, but not essential, to use a polymerization inhibitor, for example, hydroquinone, catechol and the like, in an amount of about 0.1% to 1% of the weight of the alpha-methylene aliphatic carboxylic acids and the above-specified derivatives thereof.

Improved results are obtained by employing catalysts, for example, strong acids such as sulfuric acid, p-toluene-sulfonic acid, trichloroacetic acid and the like, in the esterification of the acrylic acids and in alcoholysis of the corresponding lower alkyl esters. Basic catalysts such as sodium, sodium methylate, litharge can also be satisfactorily used in the alcoholysis reaction. These catalysts are added to the reaction mixture in small amounts, for example, 0.1 to 5% based on the weight of the acids and esters treated.

The best yields of these new fluorine-containing esters are obtained by conducting the reaction in a manner which provides for the continuous removal from the reaction mixture of the water, lower alkanols, i. e., methanol and ethanol, or halogen acids which are liberated. This can usually be accomplished by distillation, water being most conveniently removed by azeotropic distillation with benzene, toluene and the like. Liberated halogen acid can also be removed by carrying out the reaction of acid halide and perfluorinated alkanol in the presence of an acid acceptor such as a tertiary amine, for example, pyridine, dimethylaniline, etc., preferably in a molal excess, for example, 5–25%, over the acid halide.

The proportions of the reactants can be varied considerably, but, for most satisfactory results, the perfluoroalkanols are used in at least equimolal amounts to the alpha-methylene aliphatic carboxylic acids, their lower alkyl esters or halides, and an excess, for example, 20% to 100% or more molal excess, of the perfluoroalkanols is most advantageously employed in the esterification of the acids.

The fluorine-containing acrylates and methacrylates of this invention may be polymerized alone, with each other, or in admixture with other polymerizable compounds, broadly the polymerizable, ethylenically unsaturated, organic compounds having a C=C group, and particularly vinylidene, including vinyl, compounds and the polyhaloethylenes. Examples of such comonomers are olefins, for example, ethylene, propylene; dienes, such as butadiene, isoprene and chloroprene; vinylic hydrocarbons, such as styrene and vinyl acetylene; acrylyl and methacrylyl compounds, such as acrylonitrile, acrylamides, methacrylic acid; vinyl and vinylidene halides, such as vinyl chloride, vinyl fluoride, vinyl bromide, vinylidene chloride, vinylidene fluoride; polyhaloethylenes, such as trifluorochloroethylene and tetrafluorethylene; vinyl carboxylates, such as vinyl acetate and vinyl stearate; vinyl ethers, such as methyl vinyl ether; vinyl ketones, such as methyl vinyl ketone; vinyl pyridine and esters of maleic and fumaric acids.

The new monomeric esters and, more particularly, the polymers of this invention are especially valuable as lubricant additives because of their relative inertness and, in addition, are useful in making coating compositions, especially corrosion proof coatings and in other coating applications where low refractivity and high thermal stability are desired. The polymers are also useful in rubber compositions and can be compounded with plasticibers, pigments, fillers and other polymeric materials.

As many apparently widely different embodiments of this invention may be made without departing from the spirit and scope thereof, it is to be understood that the invention is not limited to the specific embodiments thereof except as defined in the appended claims.

The invention claimed is:

1. An ester of an alpha-methylene carboxylic acid wherein the alkenyl radical attached to the carboxyl group contains two to three carbon atoms, inclusive, and a straight chain fluoroalkanol having an odd number of carbon atoms of from five to thirteen, inclusive, and, exclusive of the terminal carbon atom in the primary alcohol group, —CH$_2$OH, two fluorine atoms on every carbon atom and one hydrogen on the other terminal carbon atom.

2. An ester having the formula $$CH_2=C(R)COOCH_2(CF_2CF_2)_nH$$

wherein R is from the group consisting of hydrogen and the methyl radical, and $n$ is an integer from two to six, inclusive.

3. The polymerization product of the ester defined in claim 1.

4. Octafluoropentyl acrylate having the formula $$CH_2=CHCOOCH_2(CF_2CF_2)_2H$$

5. The polymerization product of the ester defined in claim 4.

6. Octafluoropentyl methacrylate having the formula $$CH_2=C(CH_3)COOCH_2(CF_2CF_2)_2H$$

7. The polymerization product of the ester defined in claim 6.

JAMES ARTHUR BITTLES, Jr.

REFERENCES CITED

The following references are of record in the file of this patent:

UNITED STATES PATENTS

| Number | Name | Date |
|---|---|---|
| 2,411,159 | Hanford | Nov. 19, 1946 |
| 2,559,628 | Joyce | July 10, 1951 |

FOREIGN PATENTS

| Number | Country | Date |
|---|---|---|
| 580,665 | Great Britain | Sept. 16, 1946 |